United States Patent [19]
Jones et al.

[11] Patent Number: 6,038,022
[45] Date of Patent: Mar. 14, 2000

[54] COUPLING DEVICE FOR INTEGRATING AND INTERFACING ACCESSORY MODULES WITH SPECTROMETERS FOR SPECTROSCOPIC ANALYSIS

[75] Inventors: George D. Jones, Deerfield, Wis.; William B. DeSousa, Darian, Conn.

[73] Assignee: Spectra-Tech, Inc., Shelton, Conn.

[21] Appl. No.: 09/059,959

[22] Filed: Apr. 14, 1998

Related U.S. Application Data

[60] Provisional application No. 60/047,957, May 29, 1997.

[51] Int. Cl.[7] ............................. G01J 3/28; G01N 21/01
[52] U.S. Cl. ........................................ 356/326; 356/244
[58] Field of Search ................................... 356/319, 246, 356/244, 410, 326

[56] References Cited

U.S. PATENT DOCUMENTS

| | | | |
|---|---|---|---|
| 5,557,544 | 9/1996 | Simon et al. | 364/525 |
| 5,581,085 | 12/1996 | Reffner et al. | 250/339.07 |
| 5,638,171 | 6/1997 | Honig et al. | 356/244 |

*Primary Examiner*—Frank G. Font
*Assistant Examiner*—Michael P. Stafira
*Attorney, Agent, or Firm*—Cohen, Pontani, Lieberman & Pavane

[57] ABSTRACT

A coupling mechanism for mounting a sample accessory assembly into a spectrometer. The accessory assembly, on which is mountable a sample to be analyzed by a spectrometer, has connecter ends which are insertable into stirrups on the sample compartment of the spectrometer. The connector ends and the stirrups have elements that ensure that the accessory assembly is properly aligned in the sample compartment of the spectrometer. The accessory assembly also has an electronic component, such as a circuit or programmable microchip, that is connected to the spectrometer when the accessory is mounted in the spectrometer. The electronic component provides information to the spectrometer identifying the accessory assembly being used so that a diagnostic test of the spectrometer can be performed to ascertain, for example, proper mounting of the accessory assembly in the spectrometer.

16 Claims, 9 Drawing Sheets

COUPLING DEVICE FOR INTEGRATING AND INTERFACING ACCESSORY MODULES WITH SPECTROMETERS FOR SPECTROSCOPIC ANALYSIS This application claims benefit of provisional application Ser. No. 60/047,957 filed May 29, 1997.

FIELD OF THE INVENTION

The present invention relates to a coupling mechanism for mounting a sample accessory assembly into a spectrometer. More particularly, the present invention relates to an accessory assembly which automatically optically aligns the accessory assembly with the spectrometer and identifies the particular accessory assembly being used.

BACKGROUND OF THE INVENTION

A spectrometer is an analytical instrument used to determine the chemical content of a sample by irradiating the sample with a particular frequency or a particular band of frequencies of electromagnetic radiation and then analyzing the spectrum of the electromagnetic radiation from the sample. Since most chemical substances have their own distinctive and unique spectrum, a spectrum of a sample can be used to determine the chemical content of the sample. Many different techniques are used for such analysis, including external or internal reflection of the light beam through the sample, attenuation total reflection (ATR), transmission, diffuse reflection, grazing incidence, and reflection-absorption.

In conventional spectrometers, the sample to be analyzed is mounted on to a sample holder which is then placed on an accessory. The accessory, in turn, is mounted into the sample compartment of the spectrometer where the accessory and the sample must be properly aligned in the path of the beam of electromagnetic radiation used in the analysis. To analyze a second sample, the first sample is removed, the second sample is mounted on the accessory, and the second sample and the accessory is aligned. If a different accessory is required for the second sample, such as when solid and liquid samples are analyzed, additionally the new accessory must also be properly aligned.

U.S. Pat. No. 5,557,544, discloses a spectrometer including a central computer, and exchangeable components for the spectrometer, such as a radiation source, a detector, a beam splitter, a filter, and measurement probes. Each component has a data carrier for storing data identifying parameters specific to that component, such as the history and/or current properties of the component such as operation time, performance deterioration parameters, and calibration curves. The data carrier is readable and updatable by the central computer when the respective component is installed on the spectrometer. Although this device overcomes the problem of having to recalibrate the spectrometer each time a component is replaced, precise manual alignment of the sample and sample holder is still required before the analysis of the sample can begin.

U.S. Pat. No. 5,638,171 discloses a spectrophotometer which includes a sample compartment for receiving an interchangeable accessory. Each accessory includes rails which engage guides in the sample compartment of the spectrophotometer to assure that the accessory is properly aligned when fully inserted. Springs are used to resiliently hold the accessory in place. In addition, a latch is movable between a locked and an unlocked position to lock the accessory into position. Each accessory also includes an electric connection for connecting the accessory to the spectrophotometer. The electronic connection identifies the type of accessory being used. Sample cells are held within the accessory by being mounted on a sample cell holders which are held in place in the accessory by a screw. A carousel, having multiple sample cell holders, can also be mounted in the accessory. Although this device includes an electronic connection, making the setting of parameters on the spectroscope easier, in addition to mounting the sample module the user of the spectrophotometer must also lock the sample module in place to assure proper alignment of the sample module during testing.

SUMMARY OF THE INVENTION

The present invention is directed to a sample accessory for a spectrometer that is easy to handle and easy to properly install in the spectrometer.

The sample accessory assembly of the present invention has a data storage device or circuitry which identifies to the spectrometer information about the accessory assembly or its operation, such as the accessory's type, part number and serial number. The data storage device is mounted on the accessory assembly so that, when the accessory assembly is properly seated in the sample compartment of the spectrometer, the data storage device is electrically connected to circuitry in the spectrometer to provide to the spectrometer the accessory assembly's identifying information. The data storage device may be a programmable electronic digital chip or other electronic circuitry which supplies to the spectrometer the identifying information. The spectrometer uses the identifying information to perform a diagnostic test of the spectrometer to ascertain, for example, proper mounting of the accessory assembly in the spectrometer.

The accessory assembly and the spectrometer's sample compartment have elements that ensure that the accessory assembly is properly seated into the sample compartment of the spectrometer. Two stirrups or supports are mounted to each side of the sample compartment of the spectrometer along the path of the optical beam. The accessory assembly is mounted into the sample compartment of the spectrometer between these two stirrups. Engagement of the accessory assembly with the stirrups automatically properly aligns the accessory assembly with the optical beam of the spectrometer. Each stirrup has at least one clip arm which resiliently engages with a protruding cylindrical portion, or connector end, of the sample accessory assembly. Thus, when the accessory assembly is mounted into the sample compartment, the mounting of the connector ends between the clip arms of the stirrups ensures proper horizontal centering alignment of the accessory assembly in the sample compartment. The stirrups also have pads on the surface of the stirrups which contact the connector end of the accessory assembly which ensure proper vertical alignment of the accessory assembly in the sample compartment. At least one of the accessory assembly's connector ends has a projection on its circumference, and at least one of the stirrups has an appropriately sized and positioned slot. When the accessory assembly is properly mounted into the sample compartment, the projection on the connector end fits into the slot of the stirrup, thereby ensuring proper rotational alignment of the accessory assembly in the sample compartment. Alternatively, the slot may be formed on the connector end and the projection formed on the stirrup. The connector ends also have circumferential shoulders positioned to abut the stirrups when the accessory assembly is mounted in the sample compartment to ensure proper alignment along the optical beam path- Resilient members are optionally mounted between the stirrups and the connector ends of the accessory assembly to aid in ensuring proper alignment of the accessory assembly along the optical beam path and to form at least a partial seal of the path of the optical beam path so that it can be purged of light attenuating particles prior to activation of the spectrometer.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
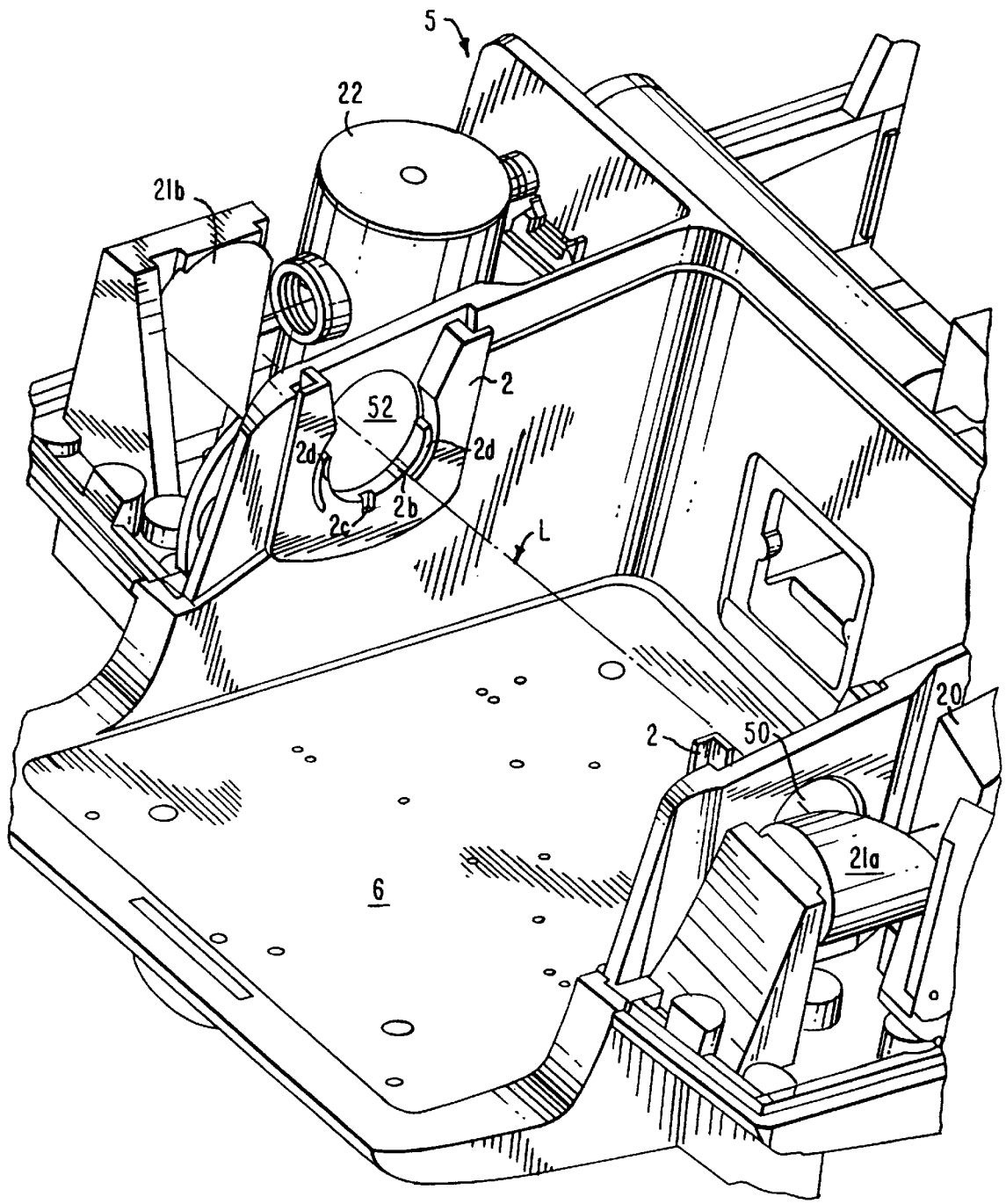
FIG. 1 is a perspective view of a spectrometer of the present invention showing the optical components used to generate and detect a light beam, and with an accessory assembly removed.

In the spectrometer 5 shown in FIG. 1, an optical beam generated by a optical signal source 20 is directed by a first mirror 21a through an entry aperture 50 into a sample compartment 6 along optical beam path L. The source 20 generates an optical beam of a desired frequency or frequency band to analyze a sample of interest. The sample compartment 6 is sized and shaped so that an accessory assembly (discussed below) can be securely and preferably removably inserted therein. The accessory assembly is used to mount a sample which is to be spectroscopically analyzed. After the optical beam has encountered the sample in the sample compartment 6, the optical beam travels along path L out of the sample compartment 6, through exit aperture 52 to a second mirror 21b, and then to detector 22, where the received optical beam is detected and converted to an electrical signal. This electrical signal is then analyzed by conventional electronic circuitry and components, such as central processing unit 30 and memory unit 31 discussed below with reference to FIG. 8, to determine the spectral characteristics of the sample.

Figures 2A, 2B:
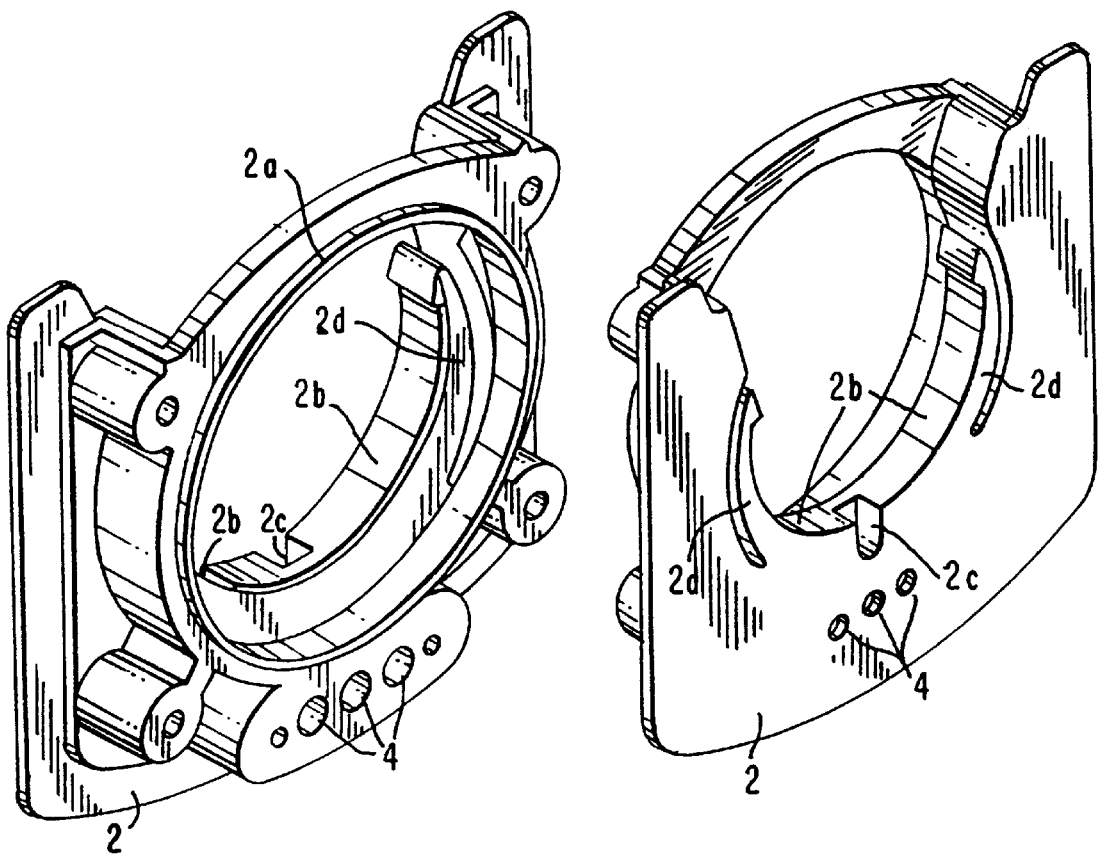
FIGS. 2a and 2b are perspective front and reverse views of a stirrup used to mount an accessory assembly in the spectrometer of the present invention.

An annular support member or stirrup 2 is mounted at the entry aperture 50 and the exit aperture 52 of the sample compartment 6 so that the optical beam L passes through the aperture in the stirrup 2. As shown in FIGS. 2a and 2b, in which a stirrup 2 is shown in detail, FIG. 2b being a back view of the stirrup shown in FIG. 2a, the stirrup 2 includes a pair of clip arms 2d that extend from the bottom of the aperture in the stirrup 2 and partially around the circumference of the aperture. Since only the bottom end of each clip arm 2d is connected to the body of the stirrup 2, the clip arms 2d have a degree of flexibility so that an accessory assembly can be releasably grasped by the clip arms 2d when the accessory assembly in inserted into the sample compartment 6, as discussed below. A slot 2c is formed in the stirrup 2 at the bottom of the aperture of the stirrup 2. The stirrup 2 also has two pads 2b mounted or formed on to the arms 2d on the surface facing into the aperture of the stirrup 2. Slot 2c and pads 2b are used for properly seating and aligning the accessory assembly on to the stirrup 2 and into the sample compartment 6. Slot 2c may be formed in one or both of the two stirrups 2, that is, the stirrup 2 at the entry aperture 50 of the sample compartment 6 and the stirrup 2 at the exit aperture 52 of the sample compartment 6.

Figure 3:
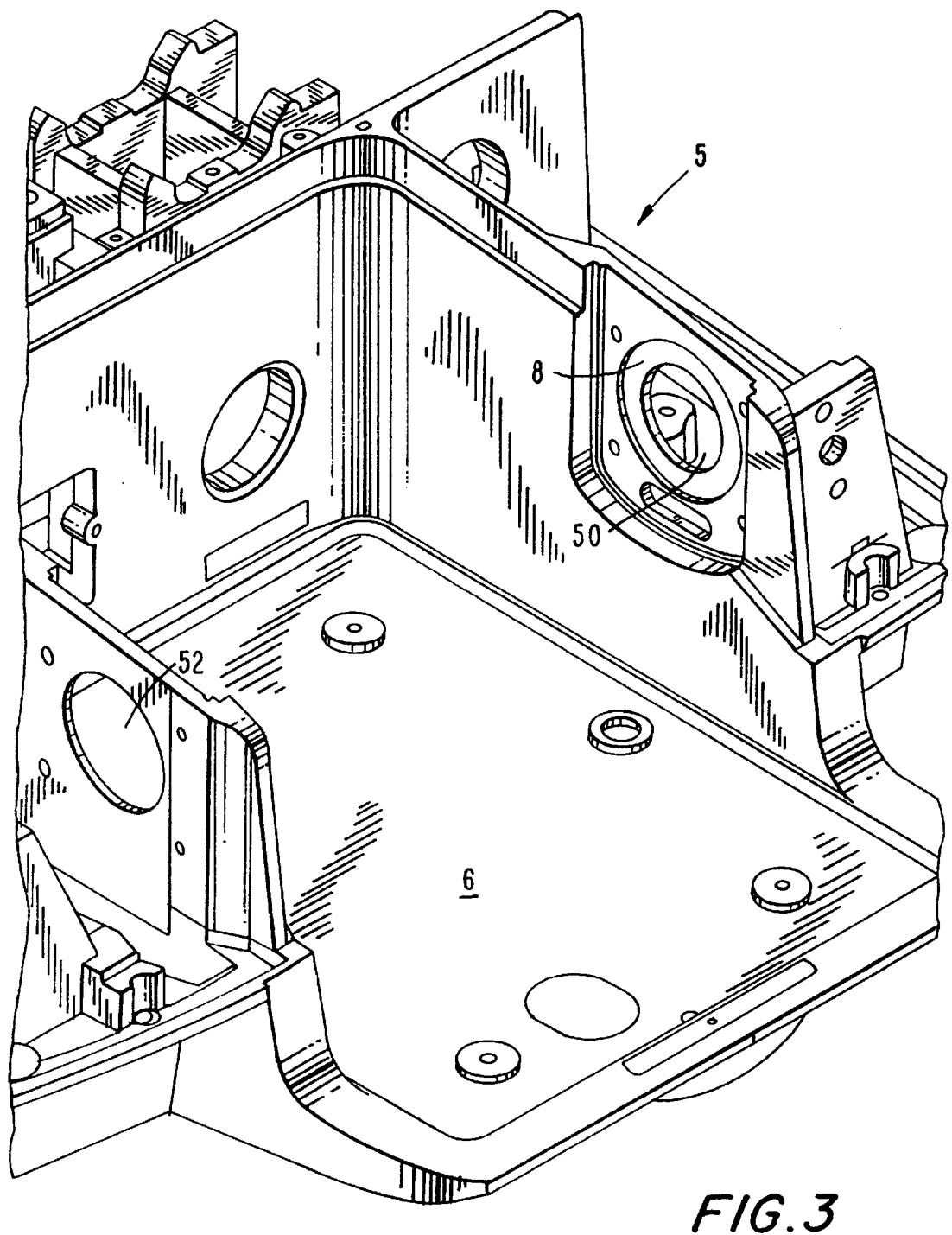
FIG. 3 is a perspective view of a portion of the spectrometer of the present invention of FIG. 1 in which the accessory assembly and stirrups are removed.

A shoulder 2a is preferably formed on the stirrup 2 about its aperture and is used to seat the stirrup 2 on to the frame of the spectrometer 5. Referring to FIG. 3 in which the sample compartment 6 of the spectrometer 5 is shown with the stirrups 2 removed, the frame of the spectrometer 5 is formed so that a counter bore 8 is formed about the entry aperture 50 and the exit aperture 52 on the side of the frame facing the sample compartment 6. The shoulder 2a of the stirrups 2 is sized and shaped to tightly fit into counterbore 8 of the frame of the spectrometer 5. The stirrups 2 are securely fastened to the frame of the spectrometer 5, either by an adhesive, by screws or by a tight frictional fit, so that all elements of the spectrometer will remain in precise optical alignment during use.

Figure 4:
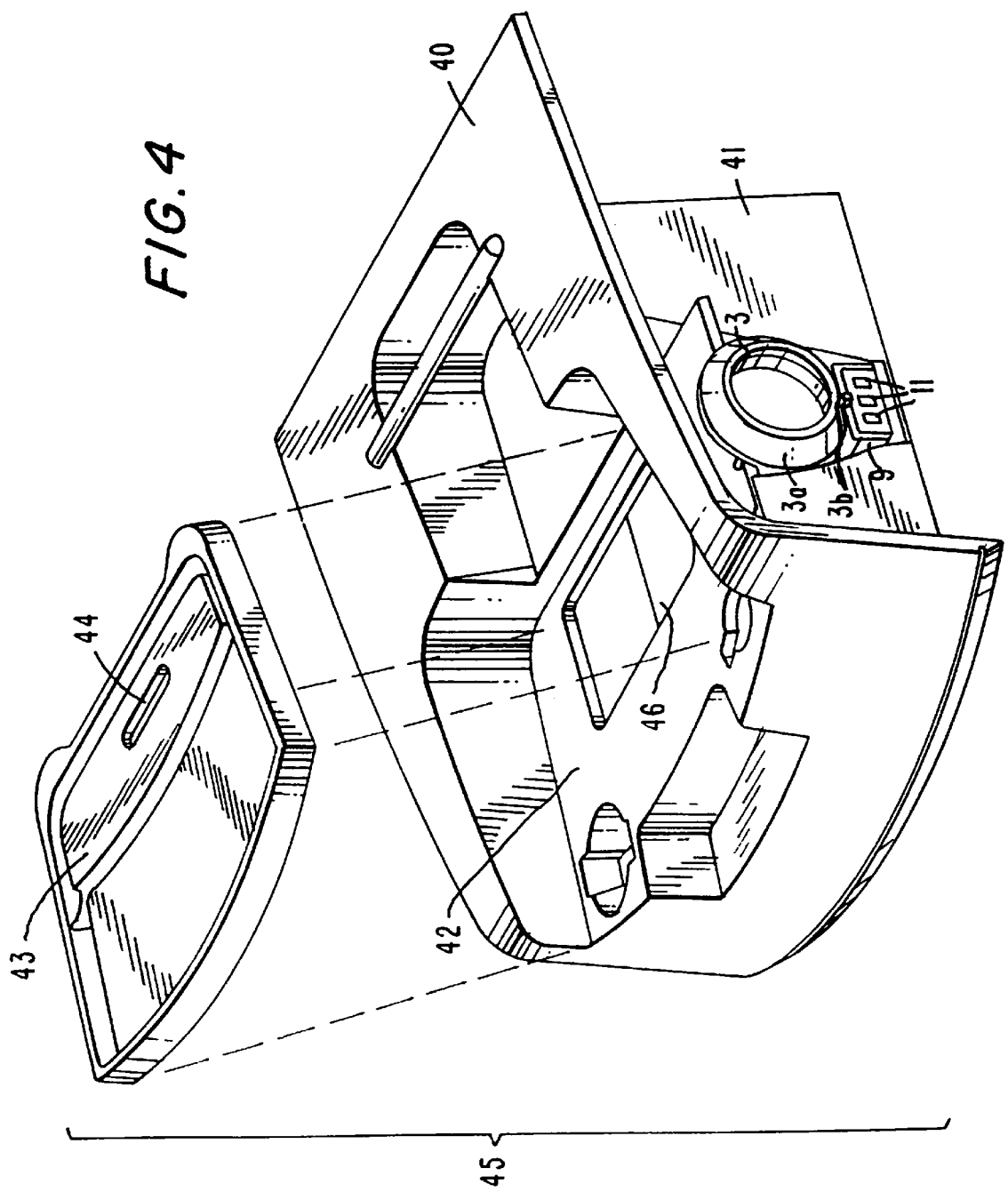
FIG. 4 is a perspective view of an accessory assembly and sample holder of the present invention.

FIG. 4 shows a preferred embodiment of an accessory assembly 45 that can be removably inserted into the sample compartment 6 of the spectrometer 5. The accessory assembly 45 has two connector ends 3, one on each side of the accessory assembly 45. The connector ends 3 are sized and shaped, preferably cylindrical, to slide into the stirrups 2 of the spectrometer 5 from above so that the clip arms 2d engage the connector ends 3 and lock the accessory assembly 45 firmly into the sample compartment 6. At least one of the connector ends 3 has a projection 3b (shown in FIGS. 5 and 6, discussed below) extending from the lower portion of the connector end 3 that is shaped and positioned to slide into the slot 2c of stirrup 2. The connector ends 3 also have a shoulder 3a that extend from the circumference of the connector end 3. When that accessory assembly 45 is seated into the sample compartment 6, the shoulders 3a of the connector ends 3 abut the face of the stirrups 2. Thus, when the accessory assembly 45 is mounted into the sample compartment 6, the mounting of the connector ends 3 between the clip arms 2d of the stirrups 2 ensures proper horizontal centering alignment of the accessory assembly 45 in the sample compartment 6, the pads 2b ensure proper vertical alignment, the insertion of the projection 3b on the connector end 3 into slot 2c of stirrup 2 ensures proper rotational alignment, and the abutment of the shoulders 3a of the connector ends 3 against the faces of the stirrups 2 ensures proper alignment along the optical beam path L.

Although the stirrups 2 are shown as having two flexible clip arms 2d, each stirrup 2 may alternatively have only one flexible clip arm 2d with a fixed guide being substituted for the second clip arm 2d. In this embodiment, the single clip arm 2d presses the connector end 3 against the pads 2b and the fixed guide. Alternatively, more than two clip arms 2d may also be used. Any type of resilient member that permits insertion of a connector end and that resiliently holds the connector end in the proper location may be used in place of the clip arm 2d. Alternatively, the sample compartment 6 may have only one stirrup 2 as described above and one static support holder with no resilient members. In this embodiment, one of the connector ends 3 is inserted into the support holder, which is sized such that the connector end snugly fits therein, such that the other of the connector ends 3 is insertable into the single stirrup 2, which resiliently holds the accessory assembly 45 in its proper position.

Figure 9A:
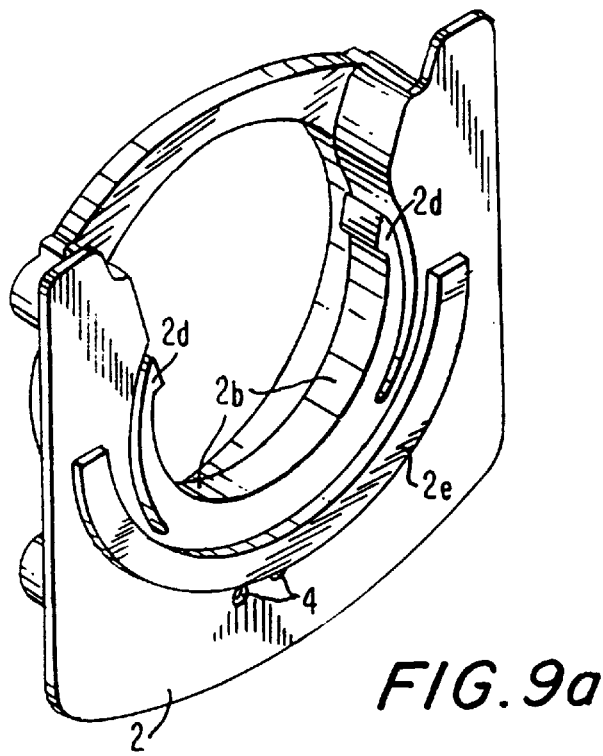
FIGS. 9a and 9b are perspective views of a stirrup and a portion of an accessory of the present invention.
Figure 9B:
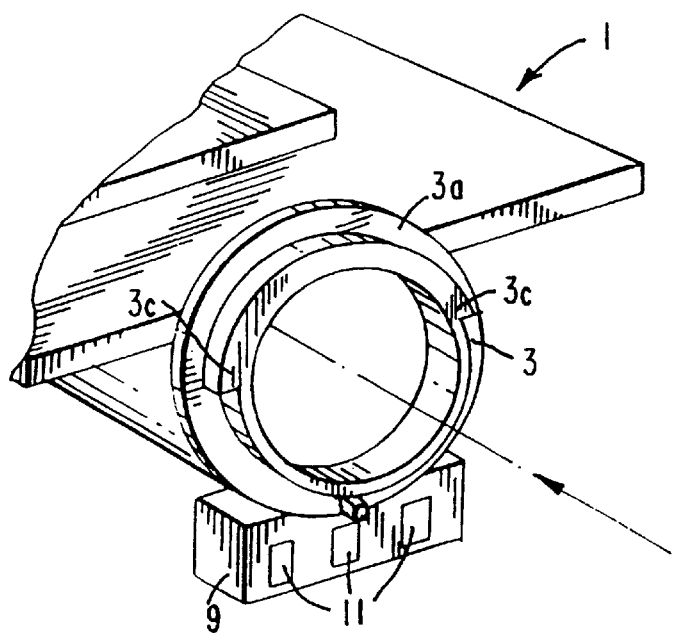

In addition, although the connector ends 3 of the accessory assembly 45 are disclosed as having a projection 3b and the stirrups 2 are disclosed as having a slot 2c, alternatively, one or both of the connector ends 3 may have a slot and one or both stirrups 2 may have an appropriately sized and positioned projection. Alternatively, instead of projections 3b and slots 2c, many different forms of mating surfaces or edges with a variety or a multiplicity of interfitting projections and slots may be used in accordance with the present invention to prevent rotation of the accessory 1 with respect to the stirrups 2. For example, as shown in FIGS. 9a and 9b, the stirrup may have a U-shaped projection 2e extending about its central aperture along its bottom portion, while the connector end has a U-shaped projection 3c extending about its central aperture along its top portion. When the accessory assembly 45 is seated in the sample compartment 6, the U-shaped projections 2e and 3c ensure proper alignment of the accessory assembly 45 in the sample compartment 6.

The accessory assembly 45 includes a frame 40 and a bottom cover 41 mounted to the frame 40 to form an enclosed cavity with an aperture 46 in a top surface of the frame 40. An accessory (not shown) is mounted into the aperture 46 of the frame 40. The sample to be analyzed is mounted onto the accessory.

Figure 5:
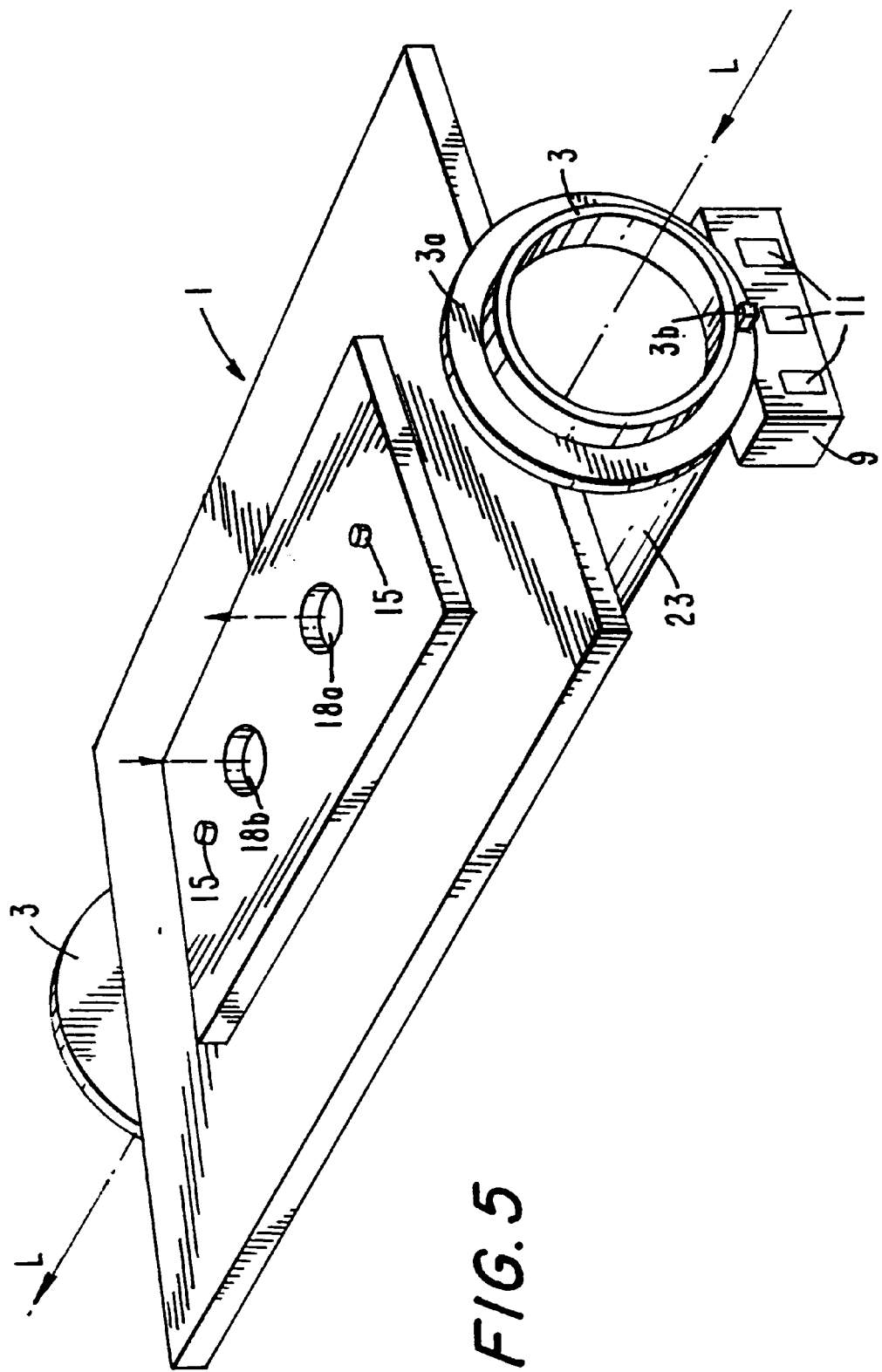
FIG. 5 is a perspective view of an accessory of the present invention.

Referring to FIG. 1, the accessory directs the optical beam L from the entry aperture 50 of the sample compartment 6 to the sample and from the sample to the exit aperture 52. One type of accessory 1 is shown in FIG. 5. The accessory 1 includes a cylinder 23 into which the optical beam L enters from the entry aperture 50 and through connector end 3. Within the cylinder 23, a mirror 24a (shown in FIG. 6) is disposed which directs the optical beam from the entry aperture 50 so that it exits the cylinder 23 through aperture 18a. Typically, a sample holder plate 43 is removably mounted onto the accessory 1, as shown in FIG. 4. The sample holder plate 43 has an aperture 44 through which the optical beam passes to strike the sample being analyzed. The sample (not shown) is positioned on top of the sample holder plate 43 over the aperture 44. The aperture 44 typically is sealed with a window that is transparent at least to the frequency or frequency band of light to be used for analysis of the sample. Thus, the window can also act as an optical filter by selecting an appropriate window material and/or coloring thereof. The material comprising the window is preferably also selected so that its refractive index causes the path of the optical beam exiting aperture 18a to be slightly bent in a direction toward aperture 18b. After the optical beam has struck the sample being analyzed, a portion of the optical beam from the sample travels back through the window in aperture 44, a where the optical beam is bent again, through aperture 18b of accessory 1, and into cylinder 23. The optical beam then strikes another mirror 24b (shown in FIG. 6) which directs the optical beam out of the cylinder 23 through the other connector end 3, through the exit aperture 52 of the sample compartment 6, to mirror 21b and to detector 22.

Protrusions 15 project upward from the surface of the accessory 1 near the sample apertures 18 and are aligned with recesses (not shown) in the lower surface of the sample holder plate 43 so that the sample holder plate 43 and its aperture 44 can be easily and properly seated on to the surface 42 of the frame 40 of the accessory assembly 45.

Figure 6:
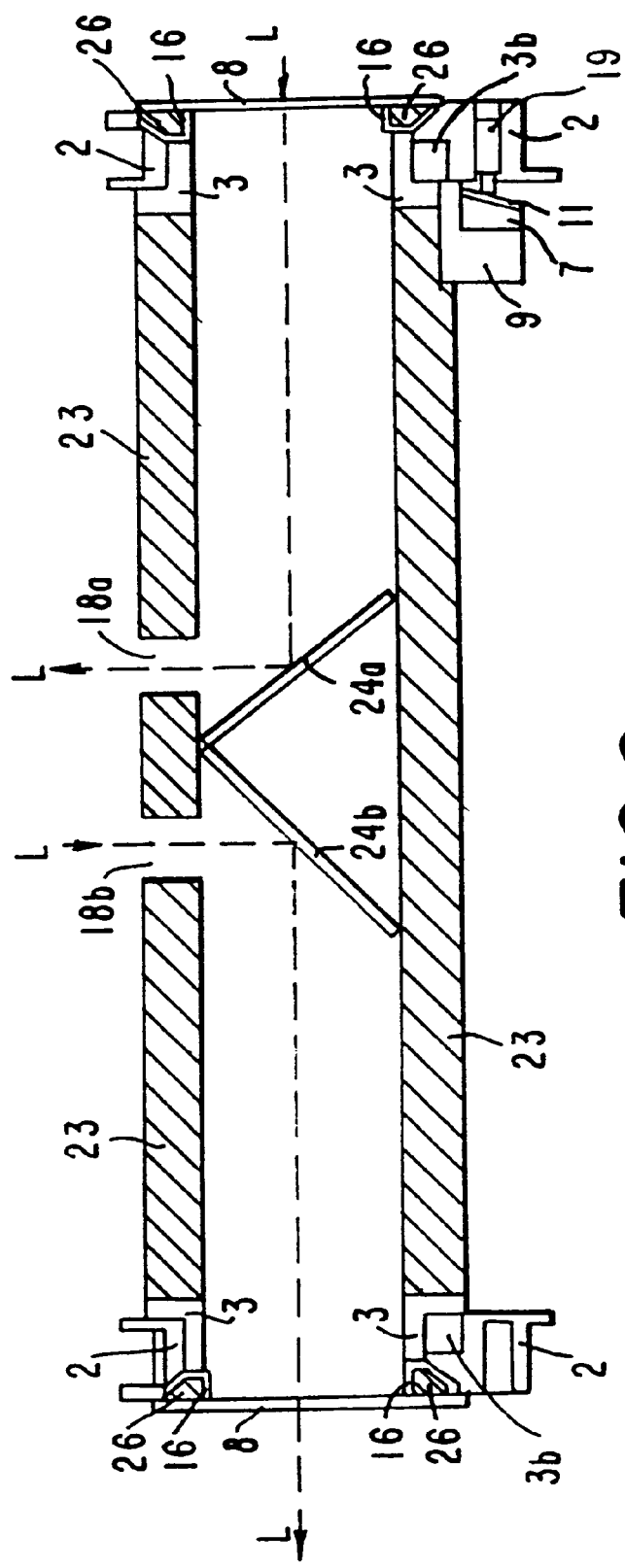
FIG. 6 is a sectional view of an accessory of the present invention as inserted into the stirrups of the spectrometer.

The projection 3b positioned at the bottom of the connector end 3 is sized, shaped and positioned to fit into slot 2c of stirrup 2, as shown in FIGS. 5 and 6.

The accessory 1 also includes a housing 9 in which a circuit board 7 is mounted that has circuitry and/or electronic components, such as a programmable electronic digital microchip, in which is stored data that identifies the particular type of accessory. Instead of a circuit board 7, the stored data may also be an optical component comprising a bar code or other optically readable data. The stored data may include manufacturer, model name or number, part number, serial number, version number, accessory identification number, accessory type, whether or not it is a permanently aligned accessory, and any other information about the accessory which may be used to distinguish it from other accessories. The stored data may also identify particular parameters under which the particular accessory should operate, such as the appropriate frequencies of electromagnetic radiation to be used with the accessory.

A plurality of electrical contacts 11, electrically connected to the circuit board 7, are positioned on the surface of the housing 9. In FIG. 5, three electrical contacts 11 are shown. The housing 9 is mounted to the cylinder 23 by any suitable means.

Figure 7:
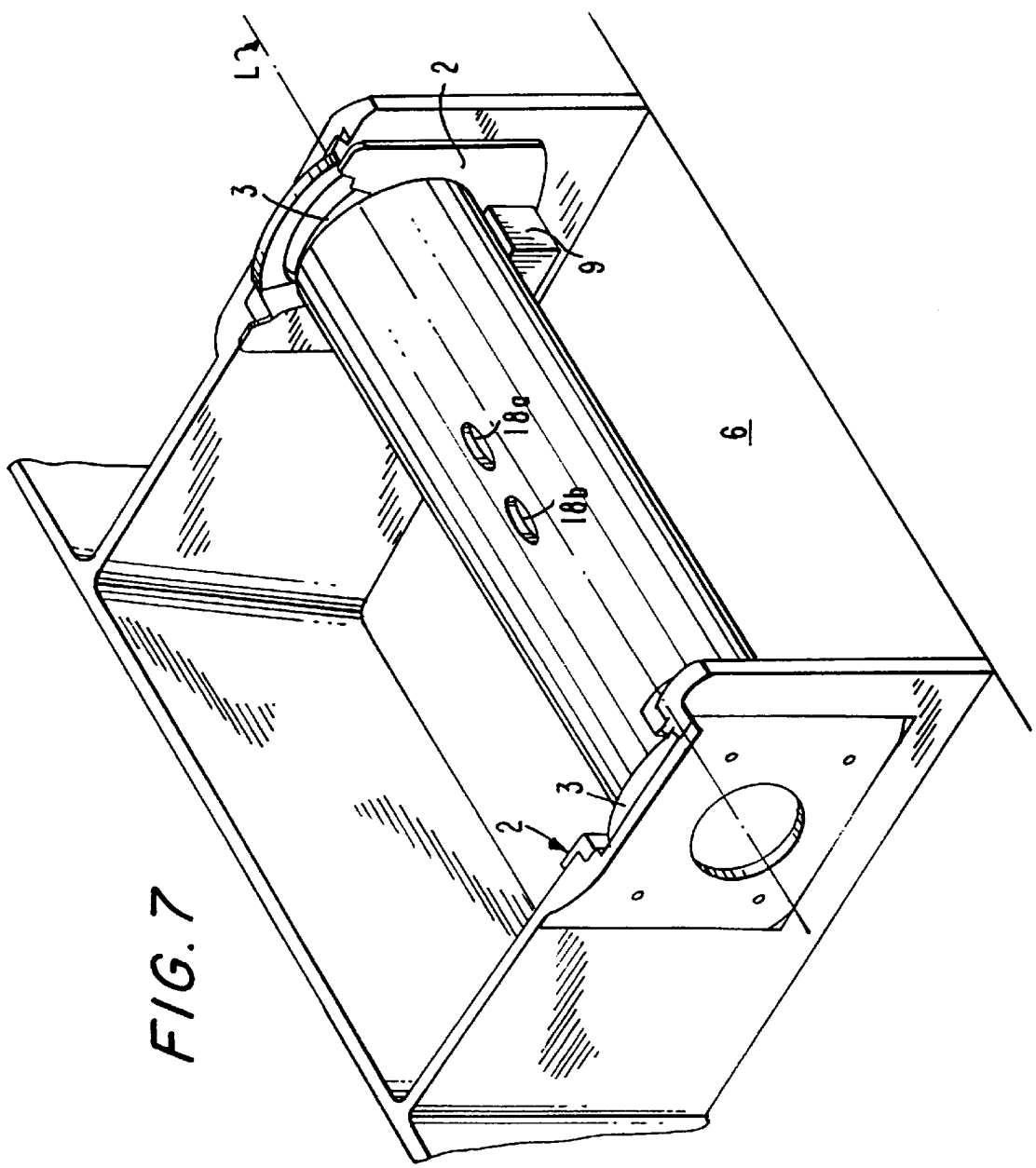
FIG. 7 is a perspective view of a portion of the accessory assembly of the present invention mounted in the stirrups of the spectrometer.

The stirrup 2 proximate the housing has a plurality of apertures 4. Three apertures 4 are shown in FIGS. 2a and 2b. Into the apertures 4 of the stirrups 2 are mounted spring loaded electrical contacts 19, as shown in FIG. 6. When the accessory is seated into the sample compartment 6, as shown FIGS. 6 and 7, the housing 9 abuts the stirrup 2 so that the spring loaded electrical contacts 19 contact the electrical contacts 11 on housing 9. The electrical contacts 19 are electrically connected to electrical components, such as central processing unit 30 discussed below, that transmit an electrical signal through electrical contacts 19 to electrical contacts 11 and the circuit 7 mounted within the housing 9 which, in response, transmits and/or modifies the signal to identify the particular type of accessory 1 being used. Although the circuit 7 and housing 9 are shown as being mounted to the shoulder 3a of the connector end 3 and the electrical contacts 19 are shown as being mounted on the stirrups 3, alternatively these elements may be mounted at different positions on the accessory assembly 45 and in the sample compartment 6, respectively, provided that the circuit 7 is electrically connected to the electrical contacts 19 when the accessory assembly 45 is properly seated into the sample compartment 6. If the data identifying the accessory is not stored in an electrical component, but is instead installed in an optical component, such as a bar code, the optical component replaces electrical contacts 11 and an optical reader, such as a bar code reader, replaces electrical contacts 19, or vice versa.

Figure 8:
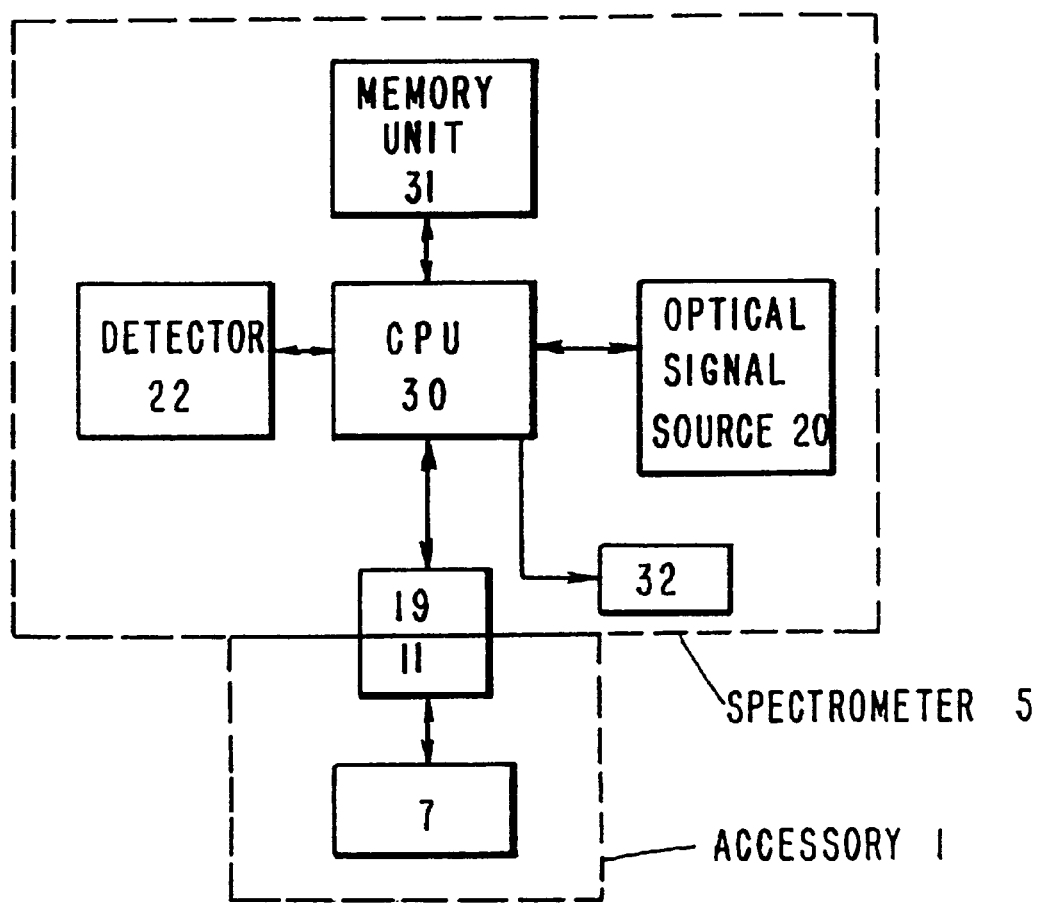
FIG. 8 is a block diagram of the spectrometer of the present invention showing the electrical components thereof.

Referring now to the block diagram of FIG. 8, the spectrometer 5 generally comprises a central processing unit (CPU) 30, a connected memory unit 31, the optical signal source 20, the detector 22, and an indicator 32. As stated above, when the accessory 1 is mounted into the spectrometer 5, the contacts 11 make an electrical connection with spring loaded contacts 19, connecting the circuit 7 to the CPU 30 of the spectrometer 5. Instead of electrical contacts 11 and 19, electromagnetic couplings or optical signals may be used for connecting stored data in circuit 7 to the CPU 30. The CPU 30 reads the identifying information encoded in the circuit 7 and retrieves parameter information from a look up table in memory unit 31. The parameter information allows the CPU 30 to perform an initial error check routine (a diagnostic test), the results of which are indicative of whether the accessory 1 and the sample holder plate 43 are properly seated in the spectrometer 5. During such a diagnostic test, the CPU 30 signals the optical signal source 20 to generate an optical beam. The CPU 30 then compares the signal received by the detector 22 to expected values which are derived from the parameter information. If the received signals are not within a preselected acceptable range, the CPU 30 transmits an error signal to an indicator 32, notifying the user that there is a problem, and preferably identifying the nature of the precise problem, such as that the accessory 1 is not properly seated. The indicator 32 may comprise a red light for a negative result, and/or a green light for a positive result. The indicator may also comprise a message indicator, such as an alpha-numeric LCD display, indicating how far out of the acceptable range was the received signal. Such information may be indicative of whether an adjustment of the accessory or a replacement of the accessory is the best solution. In the preferred embodiment, the diagnostic test comprises comparing an percentage of throughput of the light beam to an expected value to determine if the accessory is properly aligned.

After the diagnostic test is performed, the user activates the spectrometer and spectrographic readings of the sample are taken. That is, the optical beam L from the optical signal source 20 strikes the sample and is detected by the detector 22. The signal detected by the detector 22 is transmitted to the CPU 30, is compared to data stored in memory unit 31, and is analyzed. The data is then displayed on the indicator 32 or outputted to another display device such as a printer, video monitor, or data storage media, such as a computer disk.

To optimize the spectrographic analysis of a sample, typically the path through which the optical beam L passes is purged before the sample is tested to reduce attenuation of the optical beam L due to water vapor, dust and other light attenuating particles which may be present in the air. To enable such purging, the interface between the accessory 1 and the sample compartment 6 of the spectrometer 5 may be sealed by an annular gasket 26 and a sealing ring 16. As shown in FIG. 6, sealing ring 16 is positioned against the connector end 3, and gasket 26 is positioned between sealing ring 16 and the surface of counterbore 8 of spectrometer 5. Gasket 26 is preferable comprised of a spongy or resilient material that will compress, such as a plastic or a rubber. Sealing ring 16 is preferably shaped and/or comprised of a material that will compress gasket 26 when the accessory 1 is properly mounted into the sample compartment 6. After the accessory 1 has been mounted into the sample compartment 6, the sealing ring 16 and gasket 26 together provide a seal between the counterbore 8 of the spectrometer 5 and the accessory 1. The path of the optical beam may then be purged.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A coupling mechanism for mounting an accessory assembly into a sample compartment of a spectrometer, a sample to be analyzed by the spectrometer being mountable on to the accessory assembly, comprising:

two annular support members mounted to opposite sides of the sample compartment, each annular support member having an aperture therein through which an optical beam may pass for use in analyzing of the sample by the spectrometer; and two annular connector ends on the accessory assembly, each annular connector end being shaped and positioned to mount into one of said two annular support members upon mounting of the accessory assembly into the sample compartment of the spectrometer, said each annular connector end having an aperture therein through which the optical beam may pass for use in analyzing of the sample by the spectrometer;

at least one of said annular support members having a resilient clip arm shaped and positioned to extend partially around a circumference of one of said annular connector ends upon mounting of the accessory assembly into the sample compartment and to lock said one of said annular connector ends into the aperture of said at least one of said annular support members.

2. The coupling mechanism of claim 1, wherein each of said annular support members has said resilient clip arm shaped and positioned to extend partially around said circumference of one of said annular connector ends upon mounting of the accessory assembly into the sample compartment and to lock said one of said annular connector ends into the aperture of said each of said annular support members.

3. The coupling mechanism of claim 1, wherein said at least one of said annular support members having said resilient clip arm has a second resilient clip arm shaped and positioned to extend partially around said circumference of said one of said annular connector ends upon mounting of the accessory assembly into the sample compartment and to lock said one of said annular connector ends into the aperture of said at least one of said annular support members.

4. The coupling mechanism of claim 2, wherein each of said annular support members has a second resilient clip arm shaped and positioned to extend partially around said circumference of said one of annular connector ends upon mounting of the accessory assembly into the sample compartment and to lock said one of said annular connector ends into the aperture of said each of said annular support members.

5. The coupling mechanism of claim 1, wherein at least one of said annular support members has a projection formed thereon about a circumference of said aperture of said at least one of said support members, and wherein at least one of said annular connector ends has a slot formed therein about said circumference of said aperture of said at least one of said annular connector ends, said projection being shaped and positioned to fit into said slot upon mounting of the accessory assembly into the sample compartment.

6. The coupling mechanism of claim 1, wherein each of said annular support members has a projection formed thereon about a circumference of said aperture of said each of said annular support members, and wherein each of said annular connector ends has a slot formed therein about said circumference of said aperture of said each of said annular connector ends, said projections being shaped and positioned to fit into said slots upon mounting of the accessory assembly into the sample compartment.

7. The coupling mechanism of claim 1, wherein at least one of said annular connector ends has a projection formed thereon about said circumference of said aperture of said at least one of said annular connector ends, and wherein at least one of said annular support members has a slot formed therein about a circumference of said aperture of said at least one of said support members, said projection being shaped and positioned to fit into said slot upon mounting of the accessory assembly into the sample compartment.

8. The coupling mechanism of claim 1, wherein each of said annular connector ends has a projection formed thereon about said circumference of said aperture of said each of said annular connector ends, and wherein each of said annular support members have a slot formed therein about a circumference of said aperture of said each of said annular support members, projections being shaped and positioned to fit into said slots upon mounting of the accessory assembly into said sample compartment.

9. The coupling mechanism of claim 1, wherein one of said annular support members has a pad positioned within the aperture of said one of said annular support members to position mounting of one of said connector ends in said one of said annular support members upon mounting of the accessory assembly into the sample compartment.

10. The coupling mechanism of claim 1, wherein at least one of said annular connector ends has a shoulder extending from said circumference thereof, said shoulder being positioned to abut one of said annular support members upon mounting of the accessory assembly into the sample compartment.

11. The coupling mechanism of claim 10, further comprising an input electrical contact mounted to an outer surface of one of said annular connector ends, the input electrical contact being electrically connected to the electronic component, and further comprising an output electrical contact mounted to an outer surface of one of said annular support members, the output electrical contact being electrically connected to the electric circuit of the spectrometer, the input and output electrical contacts being electrically connected to one another upon mounting of the accessory assembly into the sample compartment.

12. The coupling mechanism of claim 1, further comprising a means for providing a seal between said annular connector ends and said annular support members upon mounting of the accessory assembly into the sample compartment so that a path of the optical beam may be purged of light attenuating particles.

13. The coupling mechanism of claim 5, wherein said at least one said annular support members has a pad positioned within said aperture of said at least one of said annular support members to position mounting of said at least one of said annular connector ends in said at least one of said support members upon mounting of the accessory assembly into the sample compartment.

14. The coupling mechanism of claim 13, wherein said at least one of said annular connector ends has a shoulder extending from said circumference thereof, said shoulder being positioned to abut said at least one of said support members upon mounting of the accessory assembly into the sample compartment.

15. The coupling mechanism of claim 14, further comprising a means for providing a seal between said annular connector ends and said annular support members upon mounting of the accessory assembly into the sample compartment so that a path of the optical beam may be purged of light attenuating particles.

16. The coupling mechanism of claim 1, wherein at least one of said annular support members has a projecting surface formed thereon about a circumference of the aperture of said at least one of said annular support members, and wherein at least one of said annular connector ends has a projecting surface formed thereon about said circumference of said aperture of said at least one of said annular connector ends, the projecting surfaces of said at least one of said annular support members and said at least one of said annular connector ends being shaped and positioned to fit together upon mounting of the accessory into the sample compartment to prevent relative movement thereof.

* * * * *